(12) United States Patent
Bordini

(10) Patent No.: US 6,578,549 B1
(45) Date of Patent: Jun. 17, 2003

(54) METHOD OF REGULATING AND CONTROLLING AN INTERNAL COMBUSTION ENGINE

(75) Inventor: Giorgio Bordini, Santa Cruz de Tenerife (ES)

(73) Assignee: New Holland North America, Inc., New Holland, PA (US)

( * ) Notice: Subject to any disclaimer, the term of this patent is extended or adjusted under 35 U.S.C. 154(b) by 46 days.

(21) Appl. No.: 10/026,267

(22) Filed: Dec. 21, 2001

(51) Int. Cl.[7] .............................................. F02D 41/30
(52) U.S. Cl. ...................................................... 123/350
(58) Field of Search .............................. 123/445, 350; 701/104

(56) References Cited

U.S. PATENT DOCUMENTS 6,263,858 B1 * 7/2001 Pursifull et al. ............ 123/361
6,282,485 B1 * 8/2001 Kotwicki et al. ........... 701/104

* cited by examiner

Primary Examiner—Erick Solis
(74) Attorney, Agent, or Firm—John William Stader; A. Nicholas Trausch; Rebecca L. Henkel

(57) ABSTRACT

A method of regulating and controlling an internal combustion engine forming part of a hybrid power unit of a self-propelled vehicle, the method employing a first graph showing the power transmitted by the engine as a function of the rotation speed of a drive shaft, and for different injector openings of a power-regulating injection device; and a second graph showing the torque transmitted by the drive shaft as a function of the rotation speed of the drive shaft, and for different injector openings of the power-regulating injection device; the second graph also showing the injector opening of the power-regulating injection device.

4 Claims, 2 Drawing Sheets

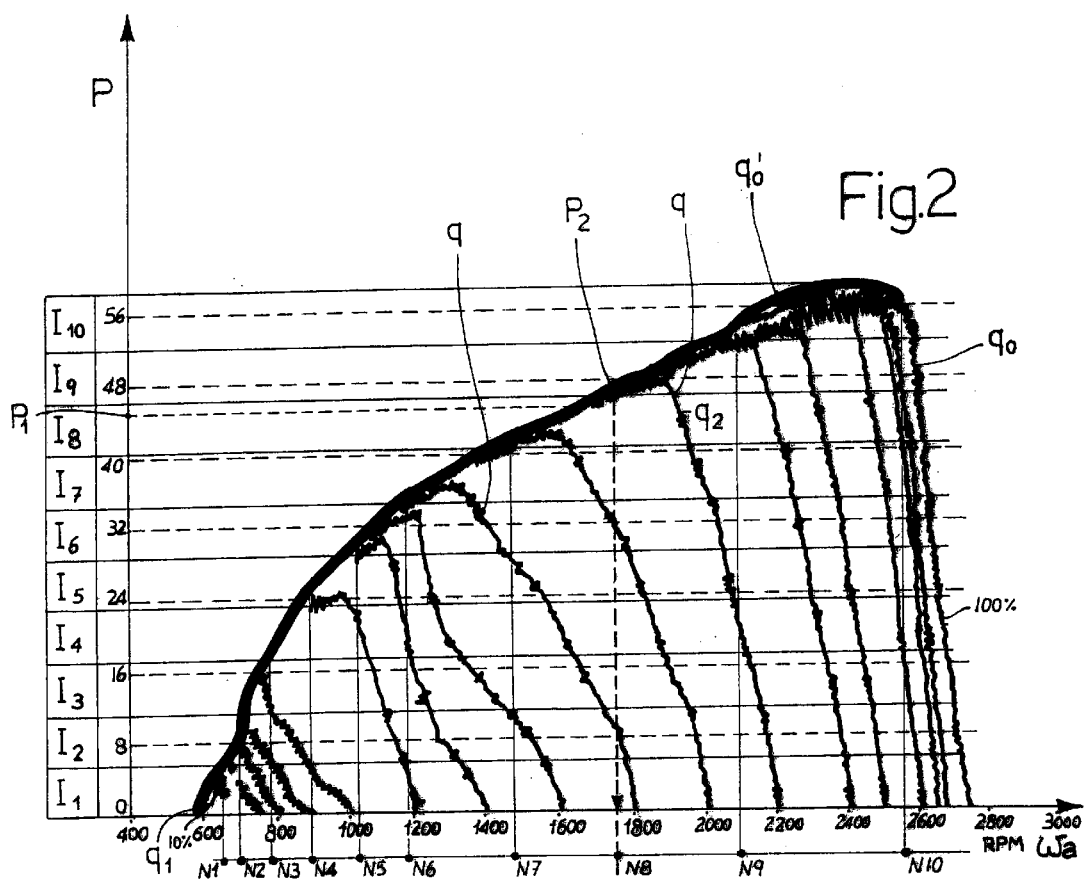
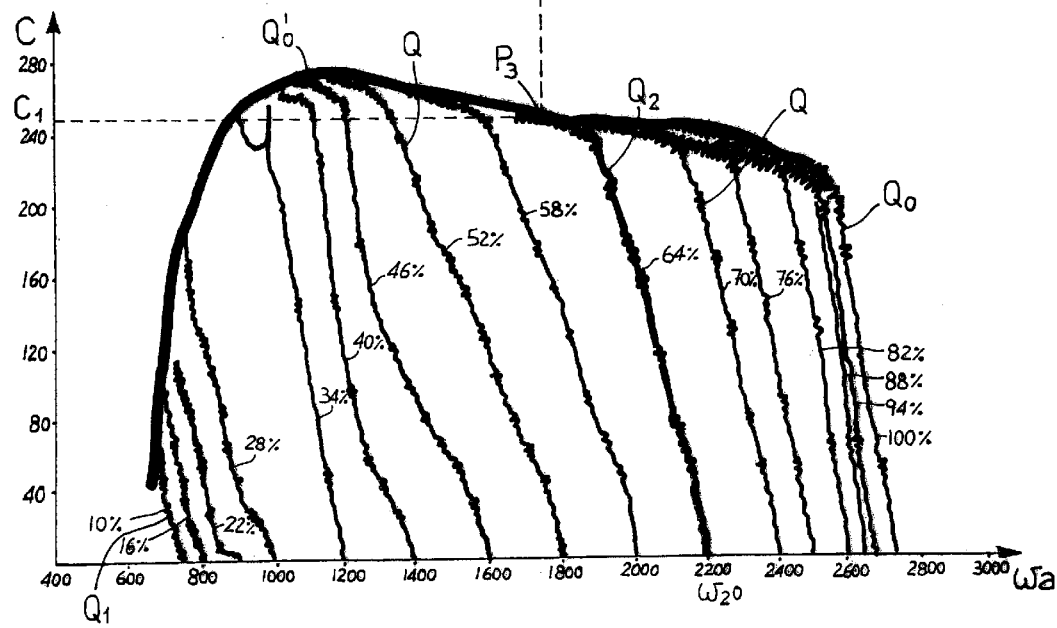
Fig.3

METHOD OF REGULATING AND CONTROLLING AN INTERNAL COMBUSTION ENGINE

BACKGROUND OF THE INVENTION

The present invention relates to a method of regulating and controlling an internal combustion engine forming part of a hybrid power unit of a self-propelled vehicle.

Known methods of controlling an internal combustion engine, in particular a diesel engine, are based on thousands of work points obtained from engine work graphs showing, for example, power and torque as a function of the rotation speed of the drive shaft. Since little ready-made data is normally available, constructing reliable maps for a given engine is an enormous job in terms of data acquisition and, obviously, in terms of time and work, and seriously complicates the electronic central control unit regulating the actuator governing the diesel engine injection pump.

SUMMARY OF THE INVENTION

It is an object of the present invention to provide a feasible, approximate solution to the problem of regulating the injection of a diesel engine to ensure low consumption, low emission of harmful gases, a low noise level, and a long working life of the engine.

The method according to the present invention can only be applied to a hybrid power unit, which, as will be seen, provides for separating control of optimum engine conditions from the actual traction power required.

Since the engine-wheel gear ratio is variable continuously, vehicle speed may vary independently of engine speed, which may therefore be selected to suit a given vehicle speed, which at best should provide for reducing specific fuel consumption (SFC), pollutant emissions, noise level, and engine wear, while at the same time preserving the elasticity and control response of the engine.

For a given traction power, current regulating methods fail to provide for transmitting the power of the engine under maximum-torque conditions. Since specific fuel consumption of an engine is minimum under maximum torque conditions, and since the noise level also increases alongside engine speed, the engine, for a given traction power, should be operated at minimum speed while at the same time providing the mean traction power required by the terrain. For this to be done, the operating point of the engine must be located on the maximum-torque curve, which means determining the injection pump setting enabling the engine to supply the necessary instantaneous power in the best conditions referred to above.

According to the present invention, there is therefore provided a method of regulating and controlling an internal combustion engine connected to a hybrid power unit of a self-propelled vehicle, the method employing a first graph showing the power transmitted by the engine as a function of the rotation speed of a drive shaft, and for different injector openings of a power-regulating injection device; and a second graph showing the torque transmitted by the drive shaft as a function of the rotation speed of the drive shaft, and for different injector openings of the power-regulating injection device.

It is another object of this invention to provide a method of regulating and controlling an internal combustion engine by dividing the y-axis of a first graph arbitrarily into a number of ranges advantageously, though not necessarily, of the same size; inserting on the y-axis of the first graph the power value required to operate the self-propelled vehicle, so as to single out one of the ranges; locating on the first graph the maximum power value in the range singled out; determining on the first graph the drive shaft rotation speed corresponding to the maximum power value located; transferring the rotation speed determined to said second graph to locate the corresponding torque value; locating on said second graph, at the point of intersection between the maximum-torque curve and the vertical line through the drive shaft rotation speed determined, the partial-torque and relative injector opening curve through the point; tracing the partial-torque curve on said second graph up to the intersection with the x-axis to determine the idling speed of the engine at the given injector opening; and determining the position of the injection pump regulating member so as to inject fuel into the engine according to the injector opening determined.

These and other objects, features and advantages are accomplished according to the instant invention by providing a method of regulating and controlling an internal combustion engine forming part of a hybrid power unit of a self-propelled vehicle, the method employing a first graph showing the power transmitted by the engine as a function of the rotation speed of a drive shaft, and for different injector openings of a power-regulating injection device; and a second graph showing the torque transmitted by the drive shaft as a function of the rotation speed of the drive shaft, and for different injector openings of the power-regulating injection device; the second graph also showing the injector opening of the power-regulating injection device.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 shows a graph employed in the method according to the invention and showing power transmission as a function of the rotation speed of the output shaft of an internal combustion engine forming part of the FIG. 1 power unit; and FIG. 3 shows a graph employed in the method according to the invention in conjunction with the FIG. 2 graph, and showing torque transmission as a function of the rotation speed of the output shaft of an internal combustion engine forming part of the FIG. 1 power unit.

DETAILED DESCRIPTION OF THE PREFERRED EMBODIMENT

Figure 1:
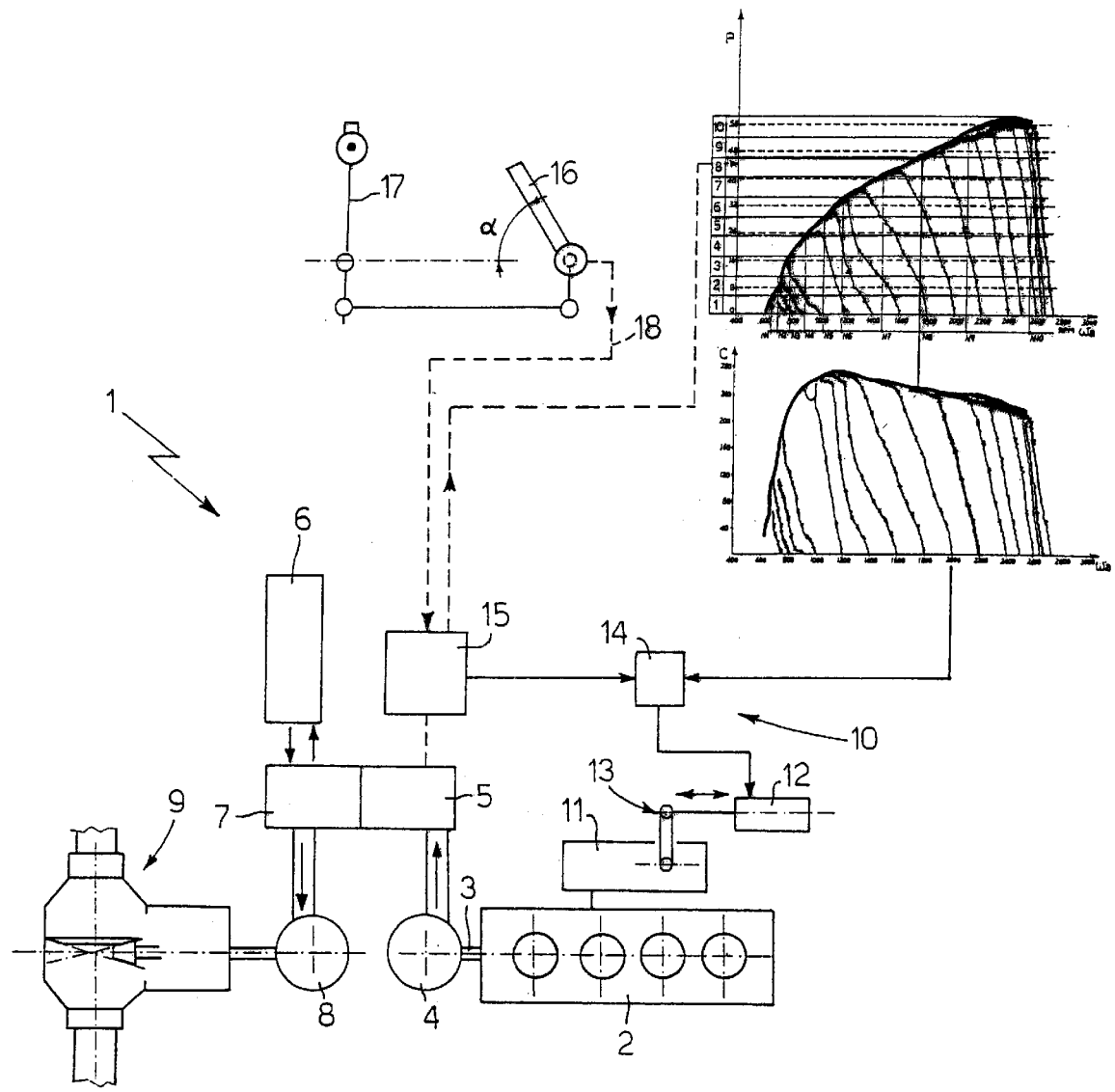
FIG. 1 shows a self-propelled vehicle power unit for implementing the method according to the present invention.

Number 1 in FIG. 1 indicates as a whole a hybrid power unit for implementing the method according to the present invention. Unit 1 in FIG. 1 is a series hybrid unit, but the teachings of the present invention may also be applied to advantage to any hybrid unit, in particular a parallel hybrid unit (not shown).

Unit 1 comprises an internal combustion engine 2, in particular a diesel engine, which, by means of a drive shaft 3, drives a generator 4 connected electrically to a charge device 5 for charging an electric energy storage device 6.

Charge device 5 and storage device 6 are connected electrically to a device 7 for controlling an electric motor 8 powering an axle 9 of a vehicle (not shown). Fuel injection into internal combustion engine 2 is controlled by an injection device 10 comprising an injection pump 11, controlled by an actuating cylinder 12 via a lever mechanism 13, and an electronic board 14 for controlling the commands from an electronic central control unit 15.

The desired vehicle speed is entered by means of a pedal 16, or a hand lever 17 connected electrically in parallel with pedal 16; and an electric line 18 connects pedal 16 and hand lever 17 to central control unit 15. As explained in detail later on, the operator, when selecting a given tilt angle α of pedal 16 or lever 17 (angle α in this case not shown) in actual fact merely selects the traveling speed of the vehicle; and the electric signal generated by the operator at pedal 16 or lever 17 is transmitted to central control unit 15 for processing to determine the state of device 10.

FIG. 1 also shows how central control unit 15 controls device 10 using the method according to the present invention, which is described in detail below with reference to FIGS. 2 and 3.

FIG. 2 shows a graph employed in the method according to the present invention, and which shows the variation in power P transmitted to output shaft 3 of engine 2 as a function of the rotation speed ωa of shaft 3, and a number of curves as a function of the injector opening of device 10, i.e. of injection pump 11.

It should be pointed out that, in this context, the term "injector opening" is intended to mean the injector opening directly proportional to the quantity of fuel injected into engine 2.

FIG. 2 shows sixteen curves corresponding to injector openings ranging between 100% and 10%.

More specifically, FIG. 2 shows sixteen injector opening curves q ranging from a curve q0 showing the operation of engine 2 with a 100% injector opening, i.e. with pump 11 fully open to inject the maximum amount of fuel into engine 2, to a curve q1 showing operation of engine 2 with a 10% injector opening of pump 11.

FIG. 2 also shows a curve q0' representing the envelope of the various opening curves q according to the maximum-opening curve q0.

FIG. 3 shows a graph employed in the method according to the present invention together with the FIG. 2 graph, and which shows the variation in torque C transmitted by engine 2 to drive shaft 3 as a function of the rotation speed ωa of shaft 3, and sixteen curves Q corresponding to injector openings ranging between 100% and 10%.

In FIG. 3, too, curves Q include a maximum, i.e. 100%, opening curve Q0; a 10% opening curve Q1; and a curve Q0' representing the envelope of the various opening curves Q according to curve Q0.

As is known, the FIG. 2 and 3 graphs are supplied by the maker of engine 2 and therefore normally vary from one engine to another. In other words, the FIG. 2 and 3 graphs relate to a given engine 2 with given construction characteristics, which, in this purely illustrative context, need not be dealt with in detail.

As stated, for a clearer understanding of the method according to the present invention, reference will now be made to FIGS. 2 and 3.

The method according to the present invention employs:
a first graph (FIG. 2) showing the power P transmitted by engine 2 (FIG. 1) as a function of the rotation speed ωa of drive shaft 3, and for different injector openings of injection device 10 regulating power P; and
a second graph (FIG. 3) showing the torque C transmitted by drive shaft 3 as a function of the rotation speed ωa of drive shaft 3, and for different injector openings of power-regulating injection device 10;

and comprises the steps of:
a. dividing the y-axis of the first graph (FIG. 2) arbitrarily into a number of ranges of given, not necessarily equal, size (in the example shown, 10 ranges I1–I10 of equal size);
b. inserting on the y-axis of the first graph the power value P1 required to operate the self-propelled vehicle, so as to single out from ranges I1–I10 the one comprising power value P1 (range 18 in the example shown);
c. locating on the first graph (FIG. 2) the maximum power value P2 in the range (I8) singled out at step (b);
d. determining on the first graph (FIG. 2)—in particular, on curve q0' relative to maximum fuel injection into engine 2—the rotation speed ωa of drive shaft 3 corresponding to the maximum power value P2 located at step (c);
e. transferring the rotation speed ωa determined at step (d) to the second graph FIG. 3) to locate the corresponding torque value C1, which is located at the point of intersection P3 between the maximum-opening torque curve Q0' and the vertical line through ωa;
f. locating on the second graph (FIG. 3) the partial-torque and relative injector opening curve Q2 (in the example shown, the injector opening is 64%) through point P3 located at step (e) and corresponding to the rotation speed ωa and torque C1 determined at steps (d) and (e);
g. tracing on the second graph (FIG. 3) the partial-torque curve Q2 corresponding to torque value C1 up to the intersection with the x-axis to determine the idling speed ω20 of the engine at the given injector opening; and
h. determining experimentally the position of actuator 12, regulating injection pump 11, which brings the idling speed of engine 2 to value ω20, so as to inject fuel into engine 2 according to the injector opening determined at step (f).

By determining idling speed ω0 for each injector opening curve Q, central control unit 15 can be calibrated accurately with no need for simulating engine 2 under load. Obviously, starting from the maximum idling speed on curve Q2, as load is applied to engine 2, rotation speed ωa decreases according to curve Q2 until the maximum torque value C1 is reached, thus achieving a minimum rotation speed ωa of shaft 3 and optimum operation of engine 2.

It should be pointed out that, even entering the maximum power value in a given range into the FIG. 2 graph, this does not necessarily mean there will be a surplus amount of power for reuse, for example, by means of electric motor 8. In most cases, the surplus amount of power will not be supplied, on account of (diesel) internal combustion engine 2 operating, at that particular speed, on a torque curve slightly lower than the maximum-torque curve.

In actual fact, the operator, using pedal 16 or hand lever 17, sets an ideal maximum power value, whereas the actual power supplied is a value between the ideal maximum and zero. In other words, if actuator cylinder 12 is set by the operator so that 64% of the fuel quantity is supplied by injection pump 11, internal combustion engine 2 can supply any power between zero and the set maximum value. Obviously, the closer P1 gets to the upper limit of range I8, the closer internal combustion engine 2 will operate to maximum torque, so that, once the Q curve (FIG. 3) on which to operate is selected as described above, the speed of internal combustion engine 2 will tend towards rotation speed and torque values giving the required operating power P1 value.

In other words, the method according to the present invention may be said to substantially calibrate the opening of injection pump 12, so that, for a given power, the most favourable torque for the corresponding rotation speed of shaft 3 is achieved at all times to minimize consumption, noise level, etc.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of regulating and controlling an internal combustion engine forming part of a hybrid power unit of a self-propelled vehicle comprising the steps of:

dividing the y-axis of a first graph, showing the power transmitted by the engine as a function of the rotation speed of a drive shaft, and for different injector openings of a power-regulating injection device, arbitrarily into a number of ranges not necessarily of the same size;

inserting on the y-axis of said first graph the power value required to operate the self-propelled vehicle, so as to single out a particular range corresponding to said power value;

locating on the first graph the maximum power value in the range singled out in said inserting step and located on a curve corresponding to the maximum injector opening of an injection pump;

determining on the first graph the rotation speed of the drive shaft corresponding to the maximum power value located at said locating step;

transferring the rotation speed determined at step to a second graph, showing the torque transmitted by the drive shaft as a function of the rotation speed of the drive shaft, and for different injector openings of the power-regulating injection device, to locate the corresponding torque value, said value being located at the point of intersection between the maximum injector opening torque curve and a vertical line through said rotation speed;

locating on the second graph the partial-torque and relative injector opening curve through the point corresponding to the rotation speed and torque value determined at said determining and transferring steps;

tracing on the second graph the partial-torque curve corresponding to said torque value up to the intersection with the x-axis to determine the idling speed of the engine at the given injector opening; and ascertaining experimentally the position of an external actuator for regulating an injection pump forming part of said power-regulating injection device, so that said pump is regulated to inject fuel into the engine according to the injector opening determined at said locating step.

2. The method of claim 1 wherein said ranges determined at said dividing step are equal in size.

3. The method of claim 2 further comprising an electronic central control unit operably connected to said internal combustion engine for operating said method.

4. The method of claim 3 wherein said internal combustion engine is a diesel engine.

* * * * *